United States Patent [19]

Sugarman

[11] 4,431,720
[45] Feb. 14, 1984

[54] IMAGING SCREEN AND COATING THEREFOR FOR REAR-PROJECTION TELEVISION

[75] Inventor: Meyer L. Sugarman, Northbrook, Ill.

[73] Assignee: Zenith Radio Corp., Glenview, Ill.

[21] Appl. No.: 399,619

[22] Filed: Jul. 19, 1982

[51] Int. Cl.$^3$ .......................... G03C 3/00; G03C 5/18; G03B 21/60

[52] U.S. Cl. ........................................ 430/17; 430/23; 430/28; 430/147; 430/152; 430/157; 430/177; 350/126

[58] Field of Search .................. 430/6, 25, 28, 148, 430/159, 157, 147, 152, 177, 17; 350/128, 126

[56] References Cited

U.S. PATENT DOCUMENTS

| | | | |
|---|---|---|---|
| 1,942,841 | 12/1931 | Shimuzu | 88/24 |
| 3,598,640 | 8/1971 | Bennett | 428/149 |
| 3,832,032 | 8/1974 | Shimada | 350/128 |
| 3,981,729 | 9/1976 | Saulnier | 430/28 |
| 4,149,888 | 4/1979 | Loprest | 430/157 |
| 4,309,073 | 1/1982 | Nishimura et al. | 350/128 |

FOREIGN PATENT DOCUMENTS 808527 2/1959 United Kingdom .

*Primary Examiner*—John E. Kittle
*Assistant Examiner*—Jose G. Dees

[57] ABSTRACT

An improved rear-projection viewing screen is disclosed which is characterized by having on the viewed front surface of a lenticulated transparent substrate, a single layer having image-transmitting areas and intervening light-absorbing areas. The improved screen according to the invention includes light-scattering and photographically formed light-absorbing elements in a common binder system in the image-transmitting areas and in the intervening light-absorbing areas. The light-scattering elements provide for the diffusion of the viewed image in the light-transmitting areas. The light-scattering elements in the light-absorbing areas are effective to scatter light falling on the front surface of the screen thereby improving contrast of pictures viewed on the screen.

8 Claims, No Drawings

IMAGING SCREEN AND COATING THEREFOR FOR REAR-PROJECTION TELEVISION

BACKGROUND OF THE INVENTION AND PRIOR ART STATEMENT

This disclosure is related to projection television systems, and is particularly concerned with improving projection screens for such systems.

In many projection television systems, the image is projected onto the rear of the screen, and is viewed from the front of the screen. Embodied in the screen elements, which normally comprise one or more transparent sheets, usually of plastic, are lens elements in the form of Fresnels and lenticles, for example, which provide for focusing the image toward the viewer, and for enhancing its brightness. Ambient light reflected from the viewed surface of the screen reduces the apparent contrast of the image. To reduce the reflections to a tolerable minimum, light-absorbing elements are commonly applied to the surface of the screen on the viewer side. Such elements are typically applied to discrete areas of the screen where there is no image transmission. The elements may be in the form of black stripes running horizontally or vertically, or of black elements of other configurations corresponding to non-image-transmitting areas of the front screen surface.

The light-absorbing elements must provide for positive, permanent adherence to the surface of the screen, and preferably have a surface providing for minimum reflection of ambient light. Further, the method of application must lend itself readily to the screen manufacturing process, and be easy and simple to apply on a mass-production basis.

Viewing screens comprising a transparent substrate having a multiplicity of light-focusing optical elements on one surface of the sheet, and a planar surface on the opposite, or viewing, side, are well known in the art. An example is disclosed in U.S. Pat. No. 1,924,841 issued to Shimizu in 1934. The dark elements are typically applied in registration with the light image-transmitting areas through the screen by optical elements between the screen and the image source. This technique is described in Shimuzu and others.

In U.S. Pat. No. 3,832,032, Shimada discloses a rear-projection screen in a projector which uses a cathode ray tube as an image source. The screen has on one side a multiplicity of parallel lenticular ridges, while the other side of the screen has a plane surface provided with a plurality of light diffusing, stripe-like areas arranged alternately thereacross, and made by sandblasting. The lenticular ridges and the light diffusing stripe-like areas cooperate to provide light emerging from the screen with a horizontal diffusing angle that is said to be controllably greater than the vertical diffusing angle thereof. The light-absorbing stripes are said to be operative to absorb ambient light and thereby avoid deterioration of the contrast of an image projected through the screen onto the plane surface thereof. A black, light-absorbing material is coated over the planar surface of the sheet except in those areas where the light focused by the lenticular ridges falls on the front surface of the screen. The coating is accomplished by photographic means wherein a photosensitive material deposited on the front, planar surface of the screen, is exposed to light from the rear of the screen which passes through the lenticular, focusing ridges. The photosensitive material is developed, leaving bare areas on the front surface of the screen for receiving the deposit of light-absorbing material, which is, for example, a "black pigment."

Nishimura et al discloses in U.S. Pat. No. 4,309,073 a screen assembly comprising a first layer of translucent resin having a first surface formed with a Fresnel lens, and a second surface. A second layer of translucent resin is mixed with a diffusion element such as a pigment. The second layer is integrally provided on the second surface of the first layer. The translucent resin is an acrylic. The diffuser is a thin layer of isotropic material formed by a pigment mainly consisting of $SiO_2$.

In U.S. Pat. No. 3,598,640, Bennett discloses a rear-projection screen which includes on the image-receiving face thereof a coating comprising a transparent organic vehicle and a small portion of a light-diffusing silica material. The silica material is preferably a synthetic, amorphous silica having generally micron-sized particles. Substantially all of the particles include capillary passages therein. A substantial proportion of the silica particles are held in place by a transparent organic vehicle in a manner such that at least portions of the particles are exposed to atmosphere, rather than being completely embedded in the vehicle. The benefit is said to be that a much greater light reflectivity and diffusion occurs at the air-particle interface than at a coating-particle or vehicle-particle interface, and that the capillary passages in the silica particles present a large interfacial area.

OBJECTS OF THE INVENTION

It is a general object of this invention to provide for enhanced performance of projection television systems having rear-projection screens.

It is a less general object of the invention to provide a screen coating that provides for minimum reflection of ambient light.

It is a more specific object of the invention to provide a projection screen coating formulation wherein the amount of image diffusion can be controlled.

DESCRIPTION OF THE PREFERRED EMBODIMENT

My invention provides for an improved rear-projection screen characterized by having on the viewed front surface of a lenticulated transparent substrate a single layer having image-transmitting areas and intervening light-absorbing areas. Also included are light-scattering and photographically formed light-absorbing elements in a common binder system in the image-transmitting areas and in the intervening light-absorbing areas. The light scattering elements provide for diffusion of the viewed image in the light-transmitting areas, and the light-scattering elements in the light-absorbing areas are effective to scatter light falling on the front surface of the screen. The result is improved contrast of pictures viewed on the screen. In accordance with a preferred embodiment of the invention, the image-transmitting areas and intervening light-absorbing areas comprise a positive-working photosensitive layer including diazonium salts and couplers. A preferred formulation for the coating for the screen surface, comprising a single diazo layer, is as follows- Mix thoroughly

| | |
|---|---|
| Isopropanol | 45 ml |
| 20% Cellulose Acetate Propionate in Methyl Cellosolve | 40 ml |

| -continued | |
|---|---|
| Distilled H₂O | 10 ml |
| With Stirring, add,: | |
| Stock solution comprising: | |
| Distilled H₂O 320 ml | |
| SnCl₃ 320 g | |
| Citric Acid 100 g | 0.5 ml |
| Sulfosalicylic Acid | 1.0 g |
| Resorcinol-Mono-Hydroxy Ethyl Ether | 2.5 g |
| β-Resorcylic Acid Ethanolamide | 1.5 g |
| α-Resorcylic Acid Ethanolamide | 0.4 g |
| 2-Hydroxynapthalene-3-Carboxylic Acid-Diethanol Amide | 0.5 g |
| 1-Diazo-2, 5-Dibutoxy-4-Morpholino-Benzene Borofluoride | 0.5 g |
|  | 2.0 g |
| 1-Diazo-4-N, N—Diethylamino-Benzine Borofluoride | 1.0 g |
| Allyl Hydroxyethyl Thiourea | 3.0 g |
| Continue to stir until all ingredients are dissolved then add, with continued stirring: | |
| Ludox Colloidal Silica AM (E.I. DuPont de Nemours) | 3 ml |

The quantities specified provide enough solution for a single 0.001 inch thick diazo layer on one screen of about forty-five inches in diagonal measure; the amounts can be scaled up to provide quantities for production. The normal shelf life of the solution is between twenty-four and forty-eight hours.

The solution according to the invention may be applied to the front surface of the screen; that is, the surface facing the viewer, by spin coating, dip coating, spray coating, curtain coating or by other suitable means capable of applying a uniform layer. The coating conditions should be such as to provide for the application of a coating thickness in the range of 0.0005 inch to 0.003 inch. The thickness is dependent upon the light diffusion and viewing angle characteristics desired in the light-transmitting areas of the screen. The diffusion characteristics may be adjusted in two ways: the first is by film thickness, and the second is by regulation of the amount of silica particles added to the solution according to the invention. A preferred thickness is about 0.001 inch, which is considered as providing the precise amount of diffusion for good image rendition without an untoward lessening of image brightness.

Although specific diazonium salts and couplers are utilized in the foregoing formulation, any suitable combination of diazo salts and couplers may be used to produce the black or near-black image according to the invention.

The preferred amount of colloidal silica particles according to the invention, noted as being Ludox Colloidal Silica AM manufactured by E. I. DuPont de Nemours (an equivalent having substantially identical properties may be used), is specified as being 3 milliliters, which provides for optimum diffusion at a coating thickness of 0.001 inch. The amount of light-scattering colloidal silica particles may be varied depending upon the coating thickness and diffusion characteristics desired. If, for example, a coating thickness of 0.002 inch is desired, the amount of silica particles may be reduced correspondingly, by way of example, to provide the proper amount of diffusion. The silica particles provide for the diffusion of the viewed image in the image-transmitting areas, and in the light-absorbing areas, the silica particles are effective to scatter light falling on the front surface of the screen, thereby, and according to the invention, improving the contrast of pictures viewed on the screen. The silica particles are uniformly dispersed in a common binder system, preferably a diazo binder system.

After the screen has been coated with the solution according to the invention, it is allowed to dry, which requires about 10 minutes. The coating and drying operations, and handling prior to exposure, are carried out in total darkness, or under suitable safelight conditions. As the solution is not sensitive to visible light beyond the blue range of the spectrum, bright yellow, orange, green or red light devoid of ultra-violet or blue content may be used to illuminate the work area.

After drying, the screen is exposed from the back to ultra-violet light in an exposure device similar to the "light house" used for ultra-violet exposure of shadow mask television tubes to photo-deposit phosphor dots or stripes in accordance with light-transmitting patterns of the shadow mask. Principles for design and construction of such exposure devices and the associated processes are well known to those skilled in the art (see Shimada U.S. Pat. No. 3,832,032; op. cit.). Basically, for screens to be used in projection television, ultra-violet light source placement and source configurations are designed to assure that light-transmitting areas (UV-exposed areas) of the screen are placed in the positions on the screen through which light from cathode ray tubes will be transmitted to the viewer in the final projection television assembly.

During exposure, an ultra-violet light transmitted to the coated surface by optical elements of the screen assembly decompose diazonium compounds in the coating in the areas exposed, rendering them chemically inactive as dye-formers during subsequent dye-coupling operations. Areas in which no light is transmitted by the optical elements of the screen to the front surface are unaffected and remain capable of forming dyes when exposed to an alkaline atmosphere, as will be described. Exposure is maintained for sufficient time to assure complete clearing of desired areas.

The sensitivity of the solution is such that an exposure of about ten minutes is required, using a standard graphic arts mercury light source directed through the back of the screen from a distance of about four feet. Exposure time may be shortened by use of a more intense ultra-violet source, such as arc lights or pulsed xenon sources.

After exposure, the entire coated screen surface is exposed to an alkaline atmosphere, such as aqueous ammonia fumes. For certain other diazonium-coupler systems, it may be preferable to develop by spraying with, or by immersion in an alkaline liquid developer solution, as is well known in the art. This causes the undestroyed diazonium salts to couple with the coupling agents in the coating, forming strongly colored diazonium dyes in desired areas on the front surface of the screen. Colloidal silica particles or other diffusive elements incorporated in the coating according to the invention are unaffected and serve as light-scattering and -diffusing elements in clear areas of the coating. In dyed areas, they serve to reduce specular reflectivity and thus increase effectiveness of these areas in improving contrast of the viewed image projected to the viewer.

A hard coating substantially impervious to abrasion, abrupt temperature changes, moisture, air-borne corrosives, and oxidation remains after evaporation of the volatile ingredient of the binder system. The layer according to the invention is compatible with and highly adherent to projection-type screens, whether glass or plastic. When used on a plastic screen, the solution according to the invention flexes with the flexing of the plastic, and will not chip or flake off, a quality supplied by the cellulose acetate butyrate component. The image material according to the invention is a near-black, and has a matte surface, due to addition of the diffusing particles, reflecting a minimum of ambient light.

An improved process for use in the manufacture of a rear-projection viewing screen for projection television comprises the following. The screen is of the type having image-transmissive areas and intervening light-absorbing areas on the viewed front surface of a lenticulated transparent substrate. the improved process provides for applying a single, dual-purpose layer to the viewed surface that provides both diffusion in the image-transmissive areas and image-contrast enhancement. The process comprises mixing in solution a binder system having a volatile ingredient, and positive-working, photosensitive elements. The photosensitive elements according to the preferred embodiment of the invention comprise diazonium salts sensitive to ultra-violet light and suitable couplers therefor. Light-scattering elements are uniformly dispersed in the solution. Light-scattering elements preferably comprise colloidal silica particles. The viewed surface is uniformly coated with the solution and the volatile ingredient of the common binder system is evaporated. The viewed surface is then exposed to a light source effective to selectively expose the photosensitive elements in only the image-transmitting areas. In the preferred diazo process, the ultra-violet light is effective to decompose an render inactive as dye-formers the diazonium salts present in the image-transmitting areas.

The photosensitive elements are then processed to render clear the image-transmissive areas and to create dark-colored light-absorbing elements in the non-exposed areas. In the preferred diazo process, the screen is introduced to an alkaline atmosphere for coupling the undestroyed diazonium salts with the coupling agents thus forming strongly colored diazonium dyes in the light-absorbing areas. The effect of the process according to the invention is such that in a single, dual-purpose coating, the light-scattering elements in the image-transmissive areas provide image diffusion. Also, the light-scattering elements in the light-absorbing areas provide for scattering the light falling on the viewed surface, thereby improving contrast on pictures viewed on the screen.

A major benefit of the preferred embodiment of the invention, one that provides for minimizing production time and costs, lies in the fact that only one coating step is required which provides a positive black surround image of minimum reflectivity, together with the optimum of image-forming diffusion in the light-transmitting areas of the screen. The single, dual-purpose layer applied to the viewed surface of the screen provides for both diffusion in the image-transmitting areas and image-contrast enhancement, all according to the invention.

Alternately, the image-transmitting areas and intervening light-absorbing areas may comprise, according to the invention, other positive-working photographic systems, such as a positive-working silver-halide emulsion with a transparent binder, such as gelatin or a similar material. The light transmissivity of the image-transmitting areas, and the opacity of the dark-surround elements, are provided by the well-known silver photographic image-reversal process. Another alternate according to the invention is that in which the image-transmitting areas and intervening light-absorbing areas comprise an autopositive silver halide emulsion with a binder containing silica or other diffuser. In using either of these processes, care must be used in the selection of the type of silica particles to provide both light diffusion and the decreasing of the reflection of light incident on the viewing screen in non-image transmitting areas according to the invention. The selection of silica compositions can be made without undue experimentation.

It must be recognized that changes may be made in the above-described solution and proportions thereof without departing from the true spirit and scope of the invention herein involved. It is intended that the subject matter in the foregoing description shall be interpreted as illustrative and not in a limiting sense.

I claim:

1. An improved rear-projection screen for presenting an image to a viewer, comprising:
    a lenticulated transparent substrate having a viewable front surface;
    a dual-purpose single layer coating disposed upon said front surface of said substrate and comprising image-transmitting areas and intervening light-absorbing areas,
    said coating having dispersed therein, in a common binder, light-scattering elements and photographically formed light-absorbing elements,
    said photographically formed elements serving to establish said light-absorbing areas,
    said coating area devoid of said photographically formed elements establishing said image-transmitting areas,
    said light-scattering elements included in said image-transmitting areas providing for diffusion of an image transmitted therethrough,
    said light-scattering elements included in said light-absorbing areas being effective to scatter light falling on said front surface of said substrate thereby enhancing the contrast of an image displayed upon said front surface.

2. The improved screen according to claim 1 in which said image-transmitting areas and said intervening light-absorbing areas are formed by a photographically exposed coating of a positive-working photosensitive material.

3. The improved screen according to claim 1 in which said image-transmitting areas and said intervening light-absorbing areas are formed by a photographically exposed coating of a positive-working silver-halide emulsion.

4. The improved screen according to claim 1 in which said image-transmitting areas and said intervening light-absorbing areas are formed by a photographically exposed coating of an autopositive silver emulsion.

5. The improved screen according to claim 1 in which said light-scattering elements comprise a colloidal suspension of silica particles.

6. The improved screen according to claim 2 in which said photographically exposed coating includes diazonium salts and couplers.

7. For use in the manufacture of a rear-projection viewing screen for a projection television system, said screen being of the type having image-transmissive areas and intervening light-absorbing areas on the viewed front surface of a lenticulated transparent substrate, an improved process for applying a single, dual-purpose layer to said viewed surface that provides both diffusion in said image-transmissive areas and image-contrast enhancement, the process comprising:

mixing in solution a common binder system having a volatile ingredient, and positive-working, photosensitive elements;

uniformly dispersing in said solution light-scattering elements;

uniformly coating said viewed surface with said solution and evaporating said volatile ingredient of said common binder system to form a single, dual-purpose layer;

exposing said viewed surface to a light source effective to selectively expose said photosensitive elements to define said image-transmissive areas;

processing said photosensitive elements to render clear said image-transmissive areas and to create light-absorbing elements in non-exposed areas;

such that in a single, dual-purpose coating, said light-scattering elements in said image-transmissive areas provide image diffusion, and said light-scattering elements in said light-absorbing areas provide for scattering light falling on said viewed surface, thereby improving contrast of pictures viewed on said screen.

8. For use in the manufacture of a rear-projection viewing screen for a projection television system, said screen being of the type having image-transmissive areas and intervening light-absorbing areas on the viewed front surface of a lenticulated transparent substrate, an improved process for applying a single, dual-purpose layer to said viewed surface that provides both diffusion in said image-transmissive areas and image-contrast enhancement, the process comprising:

mixing in solution a common binder system having a volatile ingredient, and positive-working, photosensitive elements comprising diazonium salts sensitive to ultra-violet light and suitable couplers therefor;

uniformly dispersing in said solution light-scattering elements consisting of colloidal silica particles;

uniformly coating said viewed surface with said solution and evaporating said volatile ingredient of said binder system to form a single, dual-purpose layer;

selectively exposing said viewed surface to ultra-violet light effective to decompose and render inactive as dye-formers said diazonium salts present to define said image-transmissive areas;

introducing said exposed surface to an alkaline atmosphere for coupling the undestroyed diazonium salts with said coupling agents thus forming strongly colored diazonium dyes in said light-absorbing areas;

such that in a single, dual-purpose coating, said light-scattering elements in said image-transmissive areas provide image diffusion, and said elements in said light-absorbing areas provide for scattering light falling on said viewed surface thereby improving contrast of pictures viewed on said screen.

* * * * *